United States Patent Office 3,423,072
Patented Jan. 21, 1969

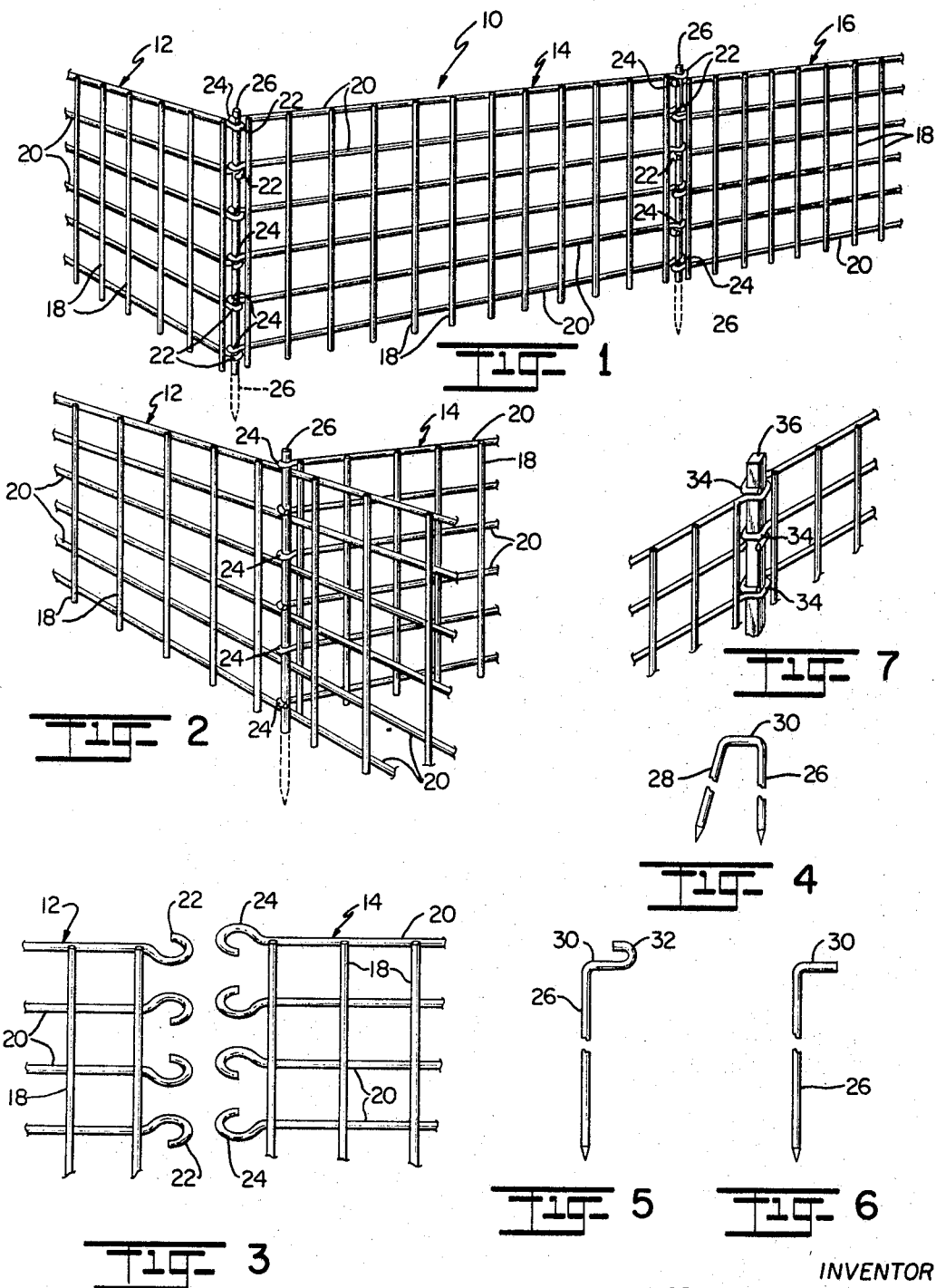

---

3,423,072
DEMOUNTABLE STRUCTURAL ASSEMBLY
Morey Bernstein, 1819 Elizabeth, Pueblo, Colo. 81003
Filed May 18, 1967, Ser. No. 639,533
U.S. Cl. 256—24                                6 Claims
Int. Cl. E04h 17/16

ABSTRACT OF THE DISCLOSURE

This invention comprises a jont for detachably and pivotally securing panel sections together to provide a composite unit, the joint between sections being comprised of a connecting or interlocking rod extending through a vertical channel formed by interdigitating unclosed hooks on the ends of adjacent sections, alternate hooks on each section opening in opposite directions.

---

This invention relates to a joint for detachably and pivotally connecting structural sections together to form a composite unit, more particularly, it relates to a joint for detachably connecting fence sections together for making pens, corrals, etc., and to the composite structure formed by connecting the structural sections together.

The invention will be illustrated by its application to fence sections detachably and pivotally connected together to form composite units, such as pens, corrals, etc.; however, it is not limited to this application as it can be used to form a composite structure for various uses by detachably connecting individual panel sections together regardless of the composition or structure of the sections.

The need for portable, demountable fences on farms and ranches and in other applications is well known. For example, such fences and pens are used to fence haystacks or make enclosures for animals, and when they are built permanently with posts and fencing, it is difficult and time-consuming to move them from place to place where a haystack is to be made or aniamls to be penned up. Accordingly, various types of portable sections which can be assembled into temporary fences or pens at desired locations are on the market.

The major disadvantage of present portable fence sections or panels is that there is no entirely satisfactory way of fastening them together. In some cases the sections are welded together and this reduces the flexibility of their applications in that different sizes and shapes of pens are difficult of construction and the composite fence unit formed cannot be transported in assembled condition. Further, the welding or other fastening operation is time-consuming.

Because of the present method of assembly of portable fence units into corrals, pens etc., the composite units are too large and unwieldy to be shipped by the manufacturer in assembled condition. The size of composite pens assembled by present means would seriously decrease their mobility for the user.

In order to eliminate the disadvantages of panel sections rigidly secured together by welding or otherwise, various means have been developed for pivotally and detachably securing the panel sections together. For example, as disclosed in U.S. Patents 1,330,404; 2,736,041 and 2,846,694, closed eyes are mounted on the ends of adjacent panels and the panels secured together by passing a vertical connecting rod between the channel formed by interdigitating or vertically overlapping eyes on the adjacent panels. The main disadvantage of such a construction is the expense to the manufacturer in fabricating the eyes and the extra metal required to make the complete closed eye. As respects the closed eyes in the structure of Patent 2,846,694 additional metal is required for the vertical rods 10a and 10b and the construction is difficult to manufacture. Further, such a joint as that disclosed in this latter patent permits limited rotation only of the sections around the point where they are connected together. An additional disadvantage of a closed eye connector is that it is not adjustable in diameter to accommodate connecting rods of different sizes to make a tight joint.

Accordingly, it is an object of this invention to provide portable sections for assembly into a composite unit which can be manufactured efficiently and with a minimum of material;

It is another object of this invention to provide a composite fence unit constructed of portable sections pivotally and detachably connected together which can be shipped and stored in flat cartons in disassembled form or transported in assembled condition;

It is another object of this invention to provide panel sections for assembly into a composite structural unit which can be assembled in the unit quickly by one man;

It is another object of this invention to provide panel sections which can be readily assembled into composite enclosures or units of various shapes and sizes;

It is another object of this invention to provide panel sections for assembly into a composite unit so constructed that two or more sections can be joined at one point with one connecting rod;

It is another object of this invention to provide portable panels for assembly into composite units so constructed that pens within pens can be made by detachably connecting the panels;

It is a further object of this invention to provide panel sections for assembly into a composite unit so constructed that one panel may be attached to a second panel at any point on the second panel to make pens within pens; and It is a further object of this invention to provide panel sections which can be assembled into composite units and which are constructed for support individually in a vertical position by a connecting rod.

The above and other objects are accomplished by a joint between panel sections comprised of a connecting rod extending through a vertical channel formed by interdigitating hooks on the ends of each panel or section, with alternate hooks on the end of each section opening in opposite directions. The structure of alternate hooks on the ends of each section opening or extending in opposite directions permits a single section to be supported vertically by an interlocking rod extending through the vertical channel formed by the hooks. It also permits pivotally and detachably connecting two sections together by an interlocking rod extending through the vertical channel formed by interdigitating semi-circular hooks on the ends of adjacent sections. The structure also permits one panel section to be connected in vertical orientation to a second section at any point on the second section when the panels are of mesh construction merely by passing the hooks of the first panel through the mesh spaces in the second panel and extending the vertical connecting rod through the vertical channel formed by the protruding hooks of the first section.

The invention is best explained by reference to the accompanying drawing wherein like parts are represented by like numerals and in which:

FIG. 1 is a perspective view of an assembled composite wire mesh unit of the invention;

FIG. 2 is a perspective view of an assembled wire mesh fence unit showing the manner in which one panel is connected in vertical orientation to a medial portion of a second panel;

FIG. 3 is a perspective view of a fragmentary showing of two panels arranged with their connecting ends adjacent each other;

FIG. 4 is a side elevational view of a connecting rod used to connect fence sections, modified to provide a brace for the rod and sections;

FIG. 5 is a side elevational view of a connecting rod modified to support a cable along the top of assembled fence sections;

FIG. 6 is a side elevational view of a connecting rod constructed with means for limiting its vertical extension through the channel between interdigitating hooks of connected fence sections, and FIG. 7 is a top view of a modified joint in which rectangular hooks and a corresponding rectangular interlocking rod are used.

Referring to FIG. 1, an assembled fenec of individual panels is represented by the numeral 10. The assembled unit 10 is comprised of individual panel sections 12, 14 and 16. In this application, fence sections are used and they are contructed of vertical strands 18 and horizontal strands 20 welded together at their points of intersection to form a mesh construction. The individual panels of mesh construction are used to illustrate the invention; however, the panel sections could be solid and/or made of various materials other than metal, such as, concrete, plastic etc.

Reference will now be made to the structure by which panels 12, 14 and 16 are detachably and pivotally secured together. Referring to FIGS. 1 and 3, it will be seen that the horizontal strands of each panel section are provided at their ends with semi-circular hooks 22 and 24, respectively. These hooks lie in a substantially horizontal plane as respects the panel sections to which they are attached, the plane in which they lie being substantially perpendicular to the plane of their respective panel sections. The hooks are constructed to extend through an arc of less than 360°. A preferred arc is about 180° as this is adequate to obtain a secure joint. They should be as small as permissible for an adequate joint in the interest of saving metal. The hooks need not be semi-circular as shown to illustrate the invention but may be made of V-shaped construction and square rods used to interlock the sections together as shown in the modification of FIG. 7. Preferably, alternate or adjacent hooks on each panel section are constructed to face or open in opposite directions. When the panels are assembled as shown in FIG. 1, the hooks on adjacent panel sections interdigitate or register with each other to form a vertical channel. To connect the two panels together when their hooks are in interdigitating relationship, an interlocking rod 26 is extended through the vertical channel formed by the overlying hooks of the respective panels.

It will be noted that the connecting rod 26 is provided with a sharpened end so that it can be driven into the ground to hold the fence sections in vertical orientation. Of course, if the sections are being mounted on cement or other hard material, the connecting rod can be attached in the hard base by various means.

The preferred embodiment of the invention is the structure in which alternate hooks on each panel section open in opposite directions. As shown in FIG. 1, the sections are assembled so that vertically adjacent corresponding hooks on connected panel sections face in opposite directions; however, the invention is not restricted to this structure as it is operative when the sections are assembled so that the adjacent corresponding hooks of the two panels face in the same direction provided alternate pairs of hooks on the two panels face in opposite directions.

In the modification of the connecting rod 26 of FIG. 4, a brace 28 in the form of a leg connected to connecting rod 26 by bridge portion 30 serves to brace the assembled fence section in vertical position. In accordance with the construction shown, the bridge 30 limits the extent of travel vertically of the rod 26 through the interdigitating hooks of connected sections and the leg 28 will be driven into the ground the same distance as the connecting rod 26 to provide its bracing effect. In the modification of connecting rod 26 shown in FIG. 5, the bridge portion 30 is provided at its end with a securing hook 32 adapted to support a cable or other type line running along the top of the fence. In FIG. 6, a modification of the connecting rod is shown in which a bridge 30 as in FIG. 4, is provided for limiting the vertical extension of rod 26 through vertically overlapping hooks of two adjacent panel sections.

The structure illustrated in FIG. 2 illustrates how one panel section is connected in vertical orientation to a second panel section at any medial point desired on the second panel section. This modification of the invention is, of course, restricted to the use of mesh panel sections or panel sections having openings through which the ends of the outer panel section can be extended. In the assembly shown, the panel 14 is positioned substantially perpendicular to panel section 12 with the hooks 24 extending entirely through meshes of panel 12. To hold the panel section in position, interlocking rod 26 is passed vertically through the channel formed by oppositely facing alternate hooks 24. This structure also illustrates how a single section can be supported alone in a vertical position by means of a connecting or interlocking rod extending through the channel formed by the alternate oppositely facing hooks on the panel section.

A modification of the joint is shown in FIG. 7 in which an open rectangular shaped hook 34 is used on the section ends and a corresponding rectangular shaped interlocking rod 36 is used to lock the sections together.

In assembling the panel sections into a composite structure, the sections can be assembled on the ground in flat position and raised to the vertical position and further assembled into pens of any shape or size. Preferably, the sections are supported during assembly in vertical position with the hooks on adjacent sections in register and the connecting rod 26 is then passed through the vertical channel formed by the hooks of the respective panels, and driven into the ground to secure the fence in vertical position. The assembly can be readily effected by a single workman.

It is readily seen from the above description that a number of advantages not obtained by prior art devices stem from the invention. In contrast to the use of closed eyes on the ends of the sections, the semi-circular or rectangular hooks used can be economically manufactured in a simple manufacturing method. All of the ends on one section can be made with a single stroke of a punch press or forming press. In contrast, if circles were made with one press, at least two different operations would be involved, and the dies would have to be changed for the different operations. Otherwise two presses would be needed, each press having a different die, thus resulting in a more expensive and time-consuming method. In order to make closed connecting eyes it would require very complicated and expensive equipment. Furthermore, making the hooks 22 and 24 of semi-circular open rather than closed construction involves a saving of substantial material and this is important in marketing highly competitive portable fences. For example, a five foot corral section has thirty-two hooks on each section and on every one hundred sections this amounts to thirty-two hundred hooks, thus the saving in material resulting from semi-circular hooks is quite impressive. What has been said above, applies not only to circular connecting means but to closed connecting means of any configuration.

The invention provides for the construction of a knockdown type unit which can be packed in flat cartons and which can be shipped and stored while occupying a minimum of space. The units can be transported in their assembled condition with the rod in place between connected sections. They can be assembled quickly by one man, thus resulting in a saving of time and labor over prior art devices.

The assembled construction provides a sturdy framework, particularly, when the modification of FIG. 4 is used to provide bracing support to the assembled sections. The sections can be assembled to form pens within pens, and an end section can always be used as a gate. A section can be swung from either end as a single section can be mounted in vertical position. Panels can be mounted vertically to a second panel at various angles to provide pens of any size or design. Partitions can be set up using hooks on only one section by using the construction shown in FIG. 2. A plurality of sections can be joined at one point by their ends, that is, a single connecting rod can be used to connect two or more sections at any one point. The hooks can be made of strong malleable material so that they can be adjusted to fit any size rod and still provide a secure joint.

A further advantage of the invention is one related to economy and stems from the fact that the hooks on the ends of the sections can be made from the two inch extension or overhang of excess wire at the end of fence sections which is available from the conventional method of manufacturing 4-inch mesh fence material. 4-inch mesh fence is used almost universally on farms ranches, etc. Due to the nature of the manufacturing process for 4-inch mesh fence sections the longest possible overhang, or excess wire protruding at each end of the section, is two inches. The invention conforms economically to this manufacturing feature in that the hooks can be made from the two inch overhang. If this were not the case, it would be necessary to modify the conventional procedure for manufacturing 4-inch fence sections to provide for additional overhang material.

It is to be understood that this invention is not limited to the exact embodimetns of the methods and apparatuses shown and described, which are merely by way of illustration and not limitation, as various other forms and modifications will be apparent to those skilled in the art, and it is, therefore, intended that the appended claims cover all such changes and modifications.

What is claimed is:

1. A demountable composite structure comprising a plurality of portable individual sections detachably and pivotally secured together by securing means; said securing means comprising a plurality of vertically spaced substantially horizontally oriented hooks on adjacent ends of each of said sections extending through an arc of less than 360° with some hooks on the two sections interdigitating, some of the alternate interdigitating hooks on each different section opening in opposite directions; said interdigitating hooks forming a vertical channel; and a removable interlocking rod extending through said vertical channel.

2. The structure of claim 1 in which all alternate hooks of each section open in opposite directions.

3. The structure of claim 1 in which vertically different interdigitating hooks on adjacent sections open in opposite directions.

4. The structure of claim 1 in which vertically adjacent hooks on adjacent sections open in the same direction to form pairs of hooks with each hook opening in the same direction and alternate pairs of hooks interdigitate and open in opposite directions.

5. A portable structural panel for detachable pivotal attachment to a like panel to form a composite structure, comprising: a body portion have on its ends a plurality of spaced substantially horizontally oriented hooks extending through an arc of less than 360°, some of the adjacent hooks on said panel opening in opposite directions; said substantially horizontally oriented hooks adapted to interdigitate with like hooks on an adjacent panel to form a vertical channel adapted to receive a removable interlocking rod for locking said panels together.

6. The panel of claim 5 in which alternate hooks open in opposite directions.

References Cited

UNITED STATES PATENTS

| | | | |
|---|---|---|---|
| 1,034,983 | 8/1912 | Crocker | 256—35 X |
| 1,068,206 | 7/1913 | Bennett | 256—35 |
| 1,446,930 | 2/1923 | Romaszkiewicz | 256—26 |
| 1,521,240 | 12/1924 | Graham | 256—25 |
| 1,811,335 | 6/1931 | Spaugh | 256—26 |
| 2,417,578 | 3/1947 | White. | |
| 2,651,502 | 9/1953 | Carvelo et al. | |
| 2,783,911 | 3/1957 | Bussing | 220—7 |
| 2,787,198 | 4/1957 | White | 52—660 |

REINALDO P. MACHADO, *Primary Examiner.*

D. L. TAYLOR, *Assistant Examiner.*

U.S. Cl. X.R.

256—32